(12) United States Patent
Yamamoto

(10) Patent No.: US 11,298,984 B2
(45) Date of Patent: Apr. 12, 2022

(54) PNEUMATIC TIRE

(71) Applicant: BRIDGESTONE CORPORATION, Tokyo (JP)

(72) Inventor: Nobuyuki Yamamoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 606 days.

(21) Appl. No.: 16/303,728

(22) PCT Filed: Feb. 17, 2017

(86) PCT No.: PCT/JP2017/005932
§ 371 (c)(1),
(2) Date: Nov. 21, 2018

(87) PCT Pub. No.: WO2017/208516
PCT Pub. Date: Dec. 7, 2017

(65) Prior Publication Data
US 2019/0270345 A1    Sep. 5, 2019

(30) Foreign Application Priority Data

Jun. 3, 2016  (JP) .............................. JP2016-112204

(51) Int. Cl.
*B60C 11/04* (2006.01)
*B60C 11/11* (2006.01)
(Continued)

(52) U.S. Cl.
CPC .......... *B60C 11/1259* (2013.01); *B60C 11/03* (2013.01); *B60C 11/0306* (2013.01);
(Continued)

(58) Field of Classification Search
CPC . B60C 11/11; B60C 11/0306; B60C 11/1236; B60C 2011/1268; B60C 11/04; B60C 11/12
See application file for complete search history.

(56) References Cited

U.S. PATENT DOCUMENTS 2,821,231 A * 1/1958 Kraft ................... B60C 11/0309
152/209.22
3,799,231 A    3/1974 Boileau
(Continued)

FOREIGN PATENT DOCUMENTS

CN    102105315 A    6/2011
EP    355636 A2 *    2/1990
(Continued)

OTHER PUBLICATIONS

May 2, 2019 Extended European Search Report issued in European Patent Application No. 17806078.6.
(Continued)

*Primary Examiner* — Steven D Maki
(74) *Attorney, Agent, or Firm* — Oliff PLC

(57) ABSTRACT

In the pneumatic tire, at least one main groove is formed in each tread portion on either side of the tire equator to form plural land portions, a microgroove that extends in the width direction and closes at a time of grounding, and a crossing microgroove that crosses the microgroove and closes at the time of grounding are formed in at least one of the land portions, such that block groups, each consisting of plural blocks aligned along the microgroove, are arranged in at least one of the land portions repeatedly in the circumferential direction, and widthwise sidewalls of blocks in a block group arranged adjacent to each other in the circumferential direction are displaced from each other along the micro-
(Continued)

groove by a distance L corresponding to from ⅓ to ½ of the arrangement pitch P of the blocks.

5 Claims, 5 Drawing Sheets

(51) Int. Cl.
  *B60C 11/12* (2006.01)
  *B60C 11/03* (2006.01)
(52) U.S. Cl.
  CPC ............... *B60C 11/04* (2013.01); *B60C 11/11* (2013.01); *B60C 11/12* (2013.01); *B60C 11/1204* (2013.01); *B60C 11/1236* (2013.01); *B60C 2011/0346* (2013.01); *B60C 2011/1209* (2013.01); *B60C 2011/1213* (2013.01); *B60C 2011/1268* (2013.01); *B60C 2200/06* (2013.01); *Y02T 10/86* (2013.01)

(56) References Cited

U.S. PATENT DOCUMENTS

| | | | |
|---|---|---|---|
| 3,875,986 A | 4/1975 | Boileau | |
| 4,055,209 A | 10/1977 | Senger | |
| 6,220,844 B1 | 4/2001 | Kusano | |
| 6,659,146 B2 | 12/2003 | Dorrie et al. | |
| 2007/0199633 A1* | 8/2007 | Hayashi | B60C 11/0311 152/209.18 |
| 2007/0284026 A1 | 12/2007 | Suzuki | |
| 2009/0095387 A1* | 4/2009 | De Barsy | B60C 11/12 152/154.2 |
| 2011/0100520 A1 | 5/2011 | Shimizu | |
| 2013/0133798 A1 | 5/2013 | Ochi | |
| 2014/0238568 A1* | 8/2014 | Haga | B60C 11/0306 152/209.18 |
| 2016/0347125 A1 | 12/2016 | Itou | |
| 2017/0305200 A1 | 10/2017 | Furusawa | |

FOREIGN PATENT DOCUMENTS

| | | |
|---|---|---|
| EP | 2151334 A1 | 2/2010 |
| JP | H03-178808 A | 8/1991 |
| JP | H09-142109 A | 6/1997 |
| JP | 2006-027305 A | 2/2006 |
| JP | 2006-076520 A | 3/2006 |
| JP | 2008-155817 A | 7/2008 |
| JP | 2009-006922 A | 1/2009 |
| JP | 2012-025206 A | 2/2012 |
| JP | 2014-162429 A | 9/2014 |
| WO | 2015/193805 A1 | 12/2015 |

OTHER PUBLICATIONS

May 16, 2017 International Search Report issued in International Patent Application No. PCT/JP2017/005932.

Mar. 3, 2020 Search Report issued in Chinese Patent Application No. 201780033157.6.

* cited by examiner

PNEUMATIC TIRE

TECHNICAL FIELD

The present disclosure relates to a pneumatic tire having at least one main groove formed in each of tread portions on both sides of the tire equator.

BACKGROUND ART

A pneumatic tire described in the following Japanese Patent Application Laid-Open (JP-A) No. 2015-074360 (Patent Document 1), for example, is known as a conventional pneumatic tire.

In such a pneumatic tire, three land portions are formed by forming one main groove in each of tread portions on both sides of the tire equator, and each land portion is provided with a plurality of microgrooves extending along a tire meridian, and a plurality of crossing microgrooves that are orthogonal to the microgrooves and extend along the tire equator as illustrated in FIG. 4 of Patent Document 1. As a result, block groups each consisting of a plurality of blocks having rectangular shapes aligned along the microgrooves are repeatedly arranged in each land portion in the circumferential direction. Consequently, the blocks are methodically arranged in a grid pattern.

SUMMARY OF INVENTION

Technical Problem

Here, a pneumatic tire having a plurality of blocks as described above has a problem that the wet performance drastically deteriorates as described below. When focusing on one block as illustrated in FIG. 8, the block 51 is crushed inward in the radial direction upon receiving a load when the block 51 enters into a grounded region. Since rubber constituting the block 51 is incompressible, all of the four sidewalls 52 bulge perpendicularly to the sidewalls 52 at this time. Here, the amount of bulging of the sidewalls 52 described above increases from both lateral ends (ridgelines extending in the height direction) 52a of each sidewall 52 toward the intermediate point between the lateral ends and increases from both vertical ends (radially inner and outer ends) of each sidewall 52 toward the intermediate point between the vertical ends as indicated by the imaginary lines, and the vicinity of the surface center (the center of gravity) of each sidewall 52 becomes the peak of the mountain where the sidewall bulges most.

When two blocks 51 bulging in such a manner are aligned such that sidewalls 52 are opposed to each other over the entire surface with a microgroove 53, which closes at a time of grounding, interposed therebetween as illustrated in FIG. 9, the vicinities of the most bulging tops are opposed right in front. Therefore, the bulging portions 54 crush each other, and the opposed sidewalls 52 of the two blocks 51 come into surface contact with each other over a wide area around a surface center portion. In addition, when the bulging portions 54 crush each other as described above, rubber that has not been absorbed by the groove 53 causes corners 56 of two sidewalls 55 that are orthogonal to the opposed sidewalls 52 of the two blocks 51 to bulge as indicated by the imaginary lines in FIG. 9. Here, when blocks 51 having sidewalls 52 deformed in such a manner are arranged in a grid pattern as described in the Patent Document 1, corner portions 56 of adjacent blocks 51 also bulge and come into closer surface contact with each other. Thus, a large part of the groove 53 between adjacent blocks 51 is closed by the surface contact between the sidewalls 52 of the blocks 51. Consequently, when the pneumatic tire runs on a wet road surface, the wet performance deteriorates, and since a space into which water can enter is narrowed, the cross-sectional area of where water flows decreases.

Moreover, when focusing on one block 51, the ground contact pressure on the surface at the radially outer end of the block 51 is high at an outer edge portion, that is, in the vicinity of the open end edges 57, and low at a center portion of the surface. However, when the blocks 51 arranged in a grid pattern enter into the grounded region as described above, a large part of the groove 53 is closed by the bulging deformation described above, the ground contact pressure in the vicinity of the open end edges 57 of each block 51 is lowered, and the ground contact pressure on the surface of each block 51 is uniformized. Here, in a case in which a portion having a high ground contact pressure exists on the surface of the block 51 as described above, such a portion destroys the water film on the road surface and comes into contact with the road surface at the time of grounding. Therefore, although the contact area increases and the wet performance is improved, the water film is not sufficiently destroyed and the wet performance is further deteriorated in a case in which a portion having a high ground contact pressure decreases and the ground contact pressure is uniformized as a whole as described above. Although it is conceivable to increase the width of the groove 53 located between blocks 51 in order to solve such a problem, this causes another problem that the amount of deformation of the block 51 during running increases and the heating value increases, causing deterioration of the rolling resistance of the pneumatic tire.

An object of the present disclosure is to provide a pneumatic tire capable of easily improving wet performance while preventing deterioration of rolling resistance.

Solution to Problem

Such an object is achieved by a pneumatic tire in which at least one main groove is formed in each tread portion on either side of the tire equator S to form a plurality of land portions, a microgroove that extends in the width direction and closes at a time of grounding, and a crossing microgroove that crosses the microgroove and closes at the time of grounding are formed in at least one of the land portions, such that block groups, each consisting of a plurality of blocks aligned along the microgroove, are arranged in at least one of the land portions repeatedly in the circumferential direction, and widthwise sidewalls of blocks in block groups arranged adjacent to each other in the circumferential direction are displaced from each other along the microgroove by a distance L corresponding to from ⅓ to ½ of an arrangement pitch P of the blocks.

Advantageous Effects of Invention

When the pneumatic tire rotates and a block enters into the grounded region, the block is crushed by a load, and each sidewall of the block bulges such that the vicinity of the surface center becomes the top of the mountain (becomes the most bulging portion). However, with the present disclosure in which the widthwise sidewalls of blocks in block groups arranged adjacent to each other in the circumferential direction are displaced from each other along the microgroove by a distance L corresponding to from ⅓ to ½ of the arrangement pitch P of the blocks as described above, the most bulging portions in blocks adjacent to each other in the circumferential direction collapse largely along the microgroove, and as a result, crushing of the most bulging portions is avoided, and the contact area between the block sidewalls decreases. Moreover, since crushing of the most bulging portions is avoided as described above, the amount of bulging in the vicinity of the corner portions of the blocks also decreases, and the contact area between the block sidewalls at this portion decreases. Thus, a space which is not closed in the microgrooves and the crossing microgrooves increases. Consequently, when the pneumatic tire runs on a wet road surface, the space into which water can enter increases, the cross-sectional area of where water flows also increases, and the wet performance is easily improved. In addition, even when the block sidewalls are deformed to bulge as described above, a measurable part of each of the microgrooves and the crossing microgrooves is not closed, and therefore a portion having a high ground contact pressure remains in the vicinity of the open end edge of each block. Consequently, the wet performance is further improved. In such a case, since it is unnecessary to increase the groove width of the microgrooves and the crossing microgrooves, deterioration of the rolling resistance can be prevented.

DESCRIPTION OF EMBODIMENTS

The following description will explain Embodiment 1 of the present invention with reference to the drawings.

Figure 1:
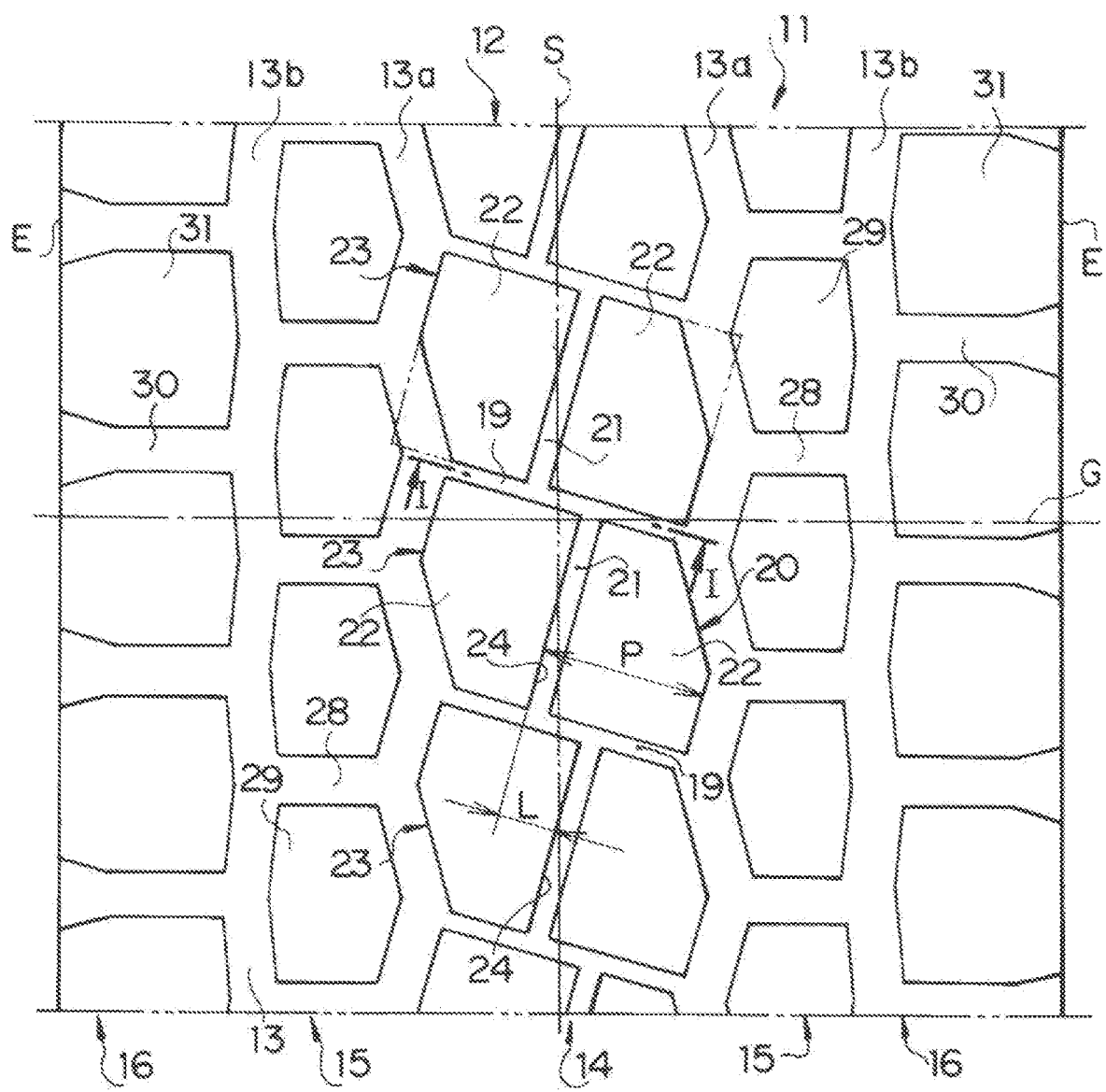
FIG. 1 is a plan view of a tread portion illustrating Embodiment 1 of the invention.
Figure 2:
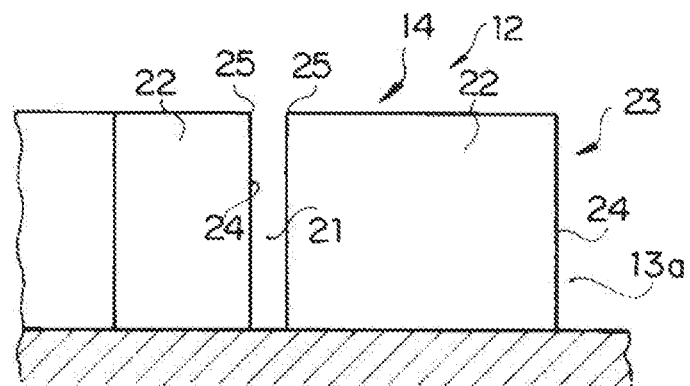
FIG. 2 is a sectional view taken along line I-I in FIG. 1.

Denoted at 11 in FIGS. 1 and 2 is a pneumatic radial tire to be mounted on a truck, a bus, or a passenger car. The pneumatic tire 11 is used in a state in which air, nitrogen gas, or the like is filled therein. The pneumatic tire 11 has a tread portion 12, which is grounded at the time of running, at a radially outer end portion. On the outer circumferential surface (tread surface) of the tread portion 12, a plurality of main grooves 13 are formed to continuously extend while bending in a zigzag manner along the tire equator S. Since the main grooves 13 are wide, the main grooves 13 do not close even at the time of grounding. Here, at least one main groove 13 is formed in each tread portion 12 on either side of the tire equator (tread center) S. In this embodiment, two main grooves 13 are formed in each of the tread portions, that is, four in total are formed. Consequently, one proximal land portion 14 extending on the tire equator S is defined between two inner main grooves 13a in closest proximity to the tire equator S. Moreover, two intermediate land portions 15 are defined between the inner main grooves 13a and two outer main grooves 13b respectively arranged on outer sides in the width direction than the inner main grooves 13a. Furthermore, two outer land portions 16 are defined between the outer main grooves 13b and tread ends E. As a result, a plurality of, for example five here, land portions are formed in the tread portion 12 to extend along the tire equator S. In the present disclosure, one main groove or three main grooves may be provided in each of tread portions 12 on both sides of the tire equator S, that is, two or six in total may be provided. Moreover, one main groove may be formed on the tire equator S in addition to the above-described main groove. Furthermore, the main groove may extend straight.

A plurality of microgrooves 19 extending in the width direction are formed in at least one land portion, or for example one proximal land portion 14 that is in closest proximity to the tire equator S by straddling the tire equator S in this embodiment, among the land portions. The microgrooves 19 extend parallel to each other and are arranged at equal intervals in the extending direction of the tire equator S. The microgrooves 19 have a groove width within a range of from 0.5 to 3.0 mm so as to close at the time of grounding, and are generally referred to as sipes. Here, the above-mentioned width direction refers to a direction that crosses the tire meridian which is orthogonal to the tire equator S, at an angle of 45 degrees or less and includes a direction parallel to the tire meridian G. At least one crossing microgroove 21, for example one crossing microgroove 21 here, is formed in each defined land portion 20 (see FIG. 4) defined between two adjacent microgrooves 19. The crossing microgrooves 21 cross the microgrooves 19 at a predetermined angle, for example 90 degrees here, and both ends thereof are continuous with the microgrooves 19 forming a substantially T shape. In a case in which a plurality of such crossing microgrooves 21 are formed, the crossing microgrooves 21 are arranged at equal intervals in the extending direction of the microgrooves 19. It is to be noted that it is preferable that the crossing angle of the crossing microgrooves 21 with respect to the microgrooves 19 is approximately 90 degrees in order to uniformize the block rigidity as a whole. The crossing microgrooves 21 also have a groove width within the range of from 0.5 to 3.0 mm so as to close at the time of grounding and are also referred to as sipes as with the microgrooves 19.

By forming microgrooves 19 which extend in the width direction and close at the time of grounding, and crossing microgrooves 21 which cross the microgrooves 19 and close at the time of grounding in at least one land portion (proximal land portion 14) as described above, block groups 23 each consisting of a plurality of (two) blocks 22 aligned at equal intervals along the microgrooves 19 are formed in the land portion (proximal land portion 14), and such block groups 23 are repeatedly arranged at equal intervals in the circumferential direction. Here, the circumferential direction refers to a direction crossing the tire equator S at an angle of less than 45 degrees and includes a direction parallel to the tire equator S. Here, in a case in which blocks 22 in two block groups 23 arranged adjacent to each other in the circumferential direction completely overlap each other in the extending direction of the crossing microgrooves 21 (the extending direction of the microgrooves 19 is not displaced) as described in the background art, a space into which water can enter is narrowed and the cross-sectional area of where water flows decreases when the pneumatic tire 11 rotates and the block 22 enters into the grounded region as described above, and the ground contact pressure is also uniformized as a whole, causing deterioration of the wet performance.

However, in this embodiment in which widthwise sidewalls on the same side in the width direction, or for example the widthwise sidewalls 24 on one side in the width direction here, of blocks 22 in block groups 23 arranged adjacent to each other in the circumferential direction are displaced along a microgroove 19 by a distance L corresponding to from ⅓ to ½ of the arrangement pitch P of the blocks 22, the most bulging portions collapse largely along the microgroove 19 in blocks 22 adjacent to each other in the circumferential direction. As a result, crushing of the most bulging portions is avoided, and the contact area between the sidewalls of the blocks 22 decreases. Moreover, by avoiding the above-described crushing of the most bulging portions, the bulging amount in the vicinity of the corner portions of the blocks 22 also decreases. As a result, the contact area between the sidewalls of the blocks 22 at this portion also decreases. Thus, a space that is not closed in the microgrooves 19 and the crossing microgrooves 21 increases. Consequently, when the pneumatic tire 11 runs on a wet road surface, a space into which water can enter increases, the cross-sectional area of where water flows also increases, and the wet performance is easily improved. In addition, even when a sidewall of a block 22 is deformed to expand as described above, a measurable part of the microgrooves 19 and the crossing microgrooves 21 is not closed. Therefore, a portion having a high ground contact pressure remains in the vicinity of the open end edge 25 of each block 22, and consequently, the wet performance is further improved. In addition, since it is unnecessary to increase the groove width of the microgrooves 19 and the crossing microgrooves 21 in such a case, deterioration of the rolling resistance can be easily prevented.

Here, the arrangement pitch P of the blocks 22 refers to the distance between the same points in blocks 22 adjacent to each other in the width direction, and is a value measured along the extending direction of a microgroove 19. In a case in which the value of the distance L is less than ⅓ of the arrangement pitch P, it is impossible to improve the wet performance, as is clear from the test examples described later. Moreover, when a relative shift occurs between the blocks 22 such that the value of the distance L exceeds ½ of the arrangement pitch P, the amount of overlap with a block 22 adjacent in the width direction becomes larger than the amount of overlap with a block 22 which has overlapped so far, and therefore the distance L is to be measured between the adjacent blocks 22. Consequently, the maximum value of the distance L is ½. Moreover, the microgrooves 19 may be extended parallel to the tire meridian G direction in a state where block groups 23 (blocks 22) shifted in the width direction as described above are arranged repeatedly in the circumferential direction. However, such a structure may possibly cause deterioration of the wet performance when the inner main grooves 13a bend acutely (at 90 degrees) to have a rectangular wave shape, and the flow of water flowing therein is deteriorated.

Therefore, in this embodiment, the microgrooves 19 are inclined at a predetermined angle with respect to the tire meridian G as described above, so that acute bending toward the width direction of the inner main grooves 13a located on both sides of the width direction of the land portion (proximal land portion 14) provided with the blocks 22 is relaxed. As a result, the flow of water at the time of draining is smoothed, and the wet performance is improved. In this embodiment, it is to be noted that corner portions protruding outward in the width direction of the blocks 22 disappear as indicated by the imaginary lines, so that the bending degree of the inner main grooves 13a is further reduced, and the wet performance is further improved. Here, the shape slightly changes from the quadrangle shape by providing a disappearing portion, though the blocks 22 have the same quadrangle shape, for example a rectangle shape here, in a case in which such a disappearing portion is not provided in the blocks 22. Moreover, in a case in which the shape of each block 22 is adjusted, blocks 22 adjacent to each other in the width direction may be slightly displaced relatively along the crossing microgroove 21.

Furthermore, in this embodiment in which the crossing microgrooves 21 cross perpendicularly with the microgrooves 19 inclined at a predetermined angle with respect to the tire meridian G as described above, the inclination direction of the microgrooves 19 with respect to the tire equator S is opposite to the inclination direction of the crossing microgrooves 21 with respect to the tire equator S. Moreover, although the crush amount of a block 22 becomes large (the bulging amount of a sidewall also becomes large) and the contribution ratio to the wet performance becomes large in a portion of the pneumatic tire 11 adjacent to the tire equator S, that is, in the tread center portion since the ground contact pressure is made higher than that of the shoulder portion by the crowning, it is possible to improve the wet performance not only at this portion but also at the entire area of the pneumatic tire 11 in a case in which the microgrooves 19 and the crossing microgrooves 21 are formed in the proximal land portion 14 in closest proximity to the tire equator S, which greatly contributes to improvement of the wet performance, as described above. In the present disclosure, it is to be noted that microgrooves 19 and crossing microgrooves 21 similar to those described above may be formed at any land portion except the proximal land portion 14, and widthwise sidewalls 24 of blocks 22 may be displaced along the microgrooves 19 by a distance L corresponding to from ⅓ to ½ of the arrangement pitch P of the blocks 22. In such a case, it is also possible to improve the wet performance in the land portion where the microgrooves 19 and the crossing microgrooves 21 are formed, while preventing deterioration of the rolling performance. Denoted at 28 are a plurality of transverse grooves, which are formed respectively in the intermediate land portions 15 and have both widthwise ends that are open to the inner and outer main grooves 13a and 13b, are spaced at equal intervals in the circumferential direction, and extend in the width direction, and these transverse grooves 28 divide the intermediate land portions 15, so that a plurality of intermediate blocks 29 spaced in the circumferential direction are defined. Denoted at 30 are a plurality of transverse grooves respectively formed in the outer land portions 16, and these transverse grooves 30 each have a widthwise inner end open to an outer main groove 13b, and a widthwise outer end open to a tread end E. Since the transverse grooves 30 extend in the width direction and are arranged at equal intervals in the circumferential direction, the outer land portions 16 are divided by the transverse grooves 30, so that a plurality of outer blocks 31 separated in the circumferential direction are defined. It is to be noted that the transverse grooves 28 and 30 may be omitted, and in such a case, the intermediate land portions 15 and the outer land portions 16 become ribs continuous in the circumferential direction.

Figure 3:
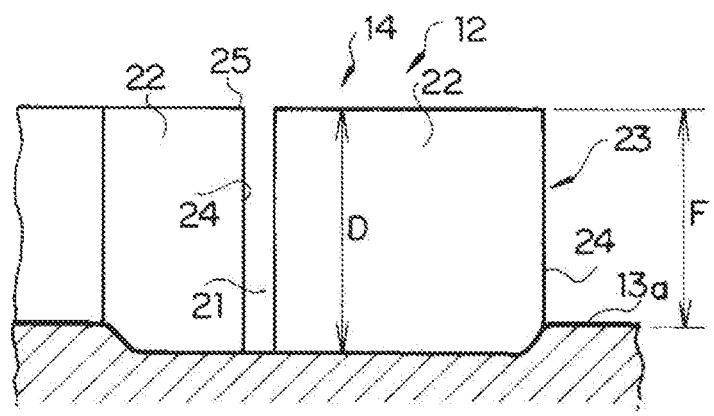
FIG. 3 is a sectional view similar to FIG. 2 illustrating Embodiment 2 of the invention.

FIG. 3 is a view illustrating Embodiment 2 of the invention and is a sectional view similar to FIG. 2. In this embodiment, a groove depth D of the microgrooves 19 and the crossing microgrooves 21 formed in the proximal land portion 14 is set larger than a groove depth F of the inner main grooves 13a that come into contact with the proximal land portions 14 at both widthwise outer sides of the proximal land portion 14. By setting the groove depth of the microgrooves 19 and the crossing microgrooves 21 closer to the tire equator S (close to the tire equator S) large as described above so as to facilitate crushing of the block 22 at this portion, the widthwise sidewalls 24 of these blocks 22 come into contact with each other over a large area at the time of grounding. Consequently, the rigidity of these blocks 22 is improved, and the rolling resistance decreases. It is to be noted that the groove depth of the microgrooves and the crossing microgrooves is set larger than the groove depth of the outer main grooves in a case in which the microgrooves and the crossing microgrooves are formed in the intermediate land portions. The other configurations and functions are the same as those of Embodiment 1.

Figure 4:
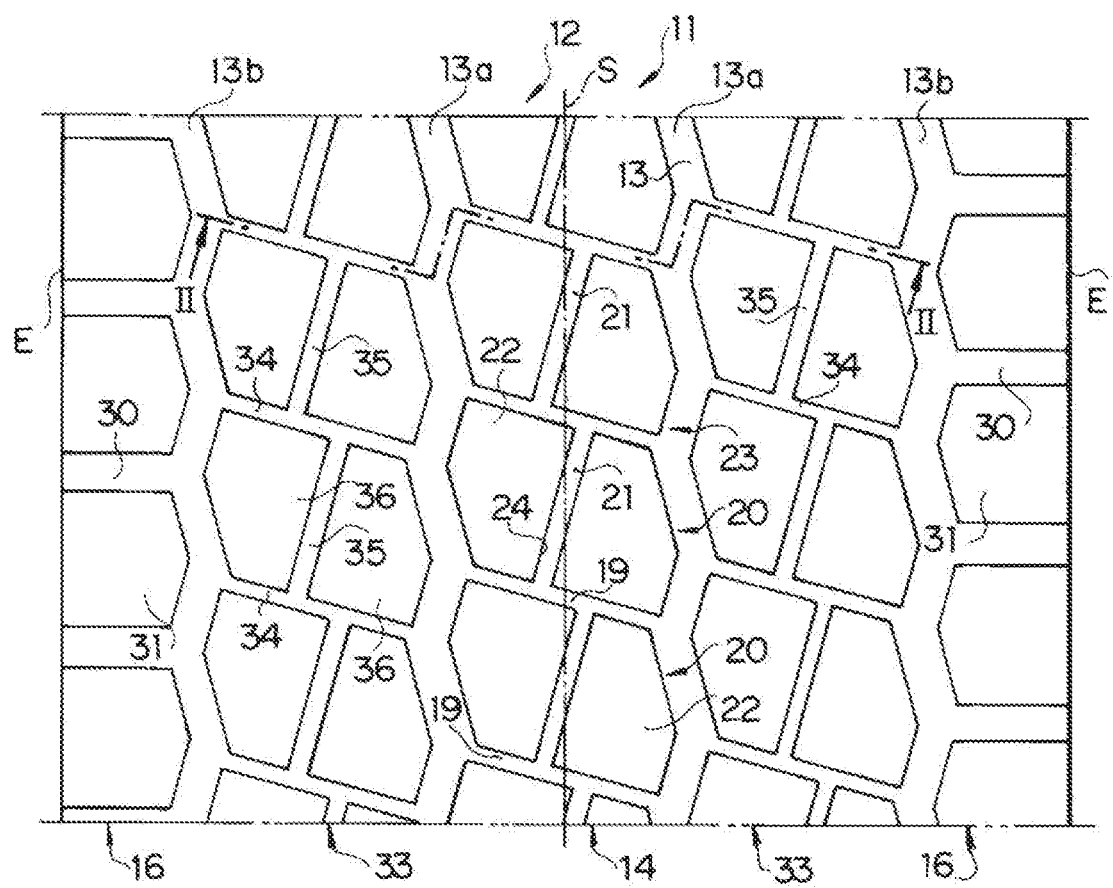
FIG. 4 is a plan view of a tread portion illustrating Embodiment 3 of the invention.
Figure 5:
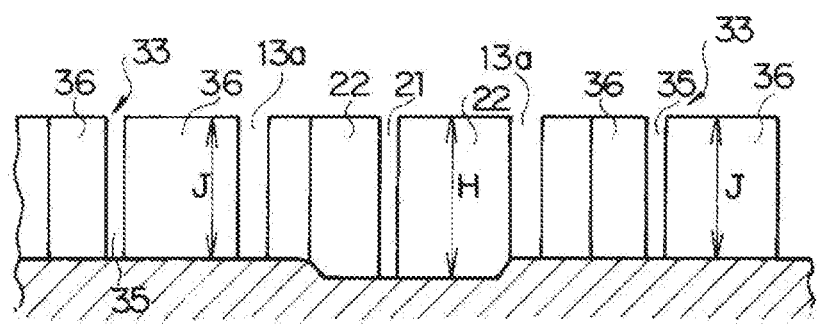
FIG. 5 is a sectional view taken along line II-II in FIG. 4.

FIGS. 4 and 5 are view illustrating Embodiment 3 of the present invention. In this embodiment, microgrooves 34 and crossing microgrooves 35 similar to the microgrooves 19 and the crossing microgrooves 21 are formed also in the land portion other than the proximal land portion 14, for example in the intermediate land portion 33 here, so that a plurality of blocks 36 are defined in the intermediate land portions 33 by the microgrooves 34 and the crossing microgrooves 35. Moreover, a groove depth H of the microgrooves 19 and the crossing microgrooves 21 formed in the proximal land portion 14 is set larger than a groove depth J of the microgrooves 34 and the crossing microgrooves 35 formed in a land portion other than the proximal land portion 14 (in the intermediate land portion 33 here). By setting the groove depth H of the microgrooves 19 and the crossing microgrooves 21 closer to the tire equator S large as described above so as to facilitate crushing of the blocks 22, the widthwise sidewalls 24 of these blocks 22 come into contact with each other over a large area at the time of grounding. Consequently, the rigidity of these blocks 22 is improved, and the rolling resistance decreases. It is to be noted that the other configurations and functions are the same as those of Embodiment 1.

Figure 6:
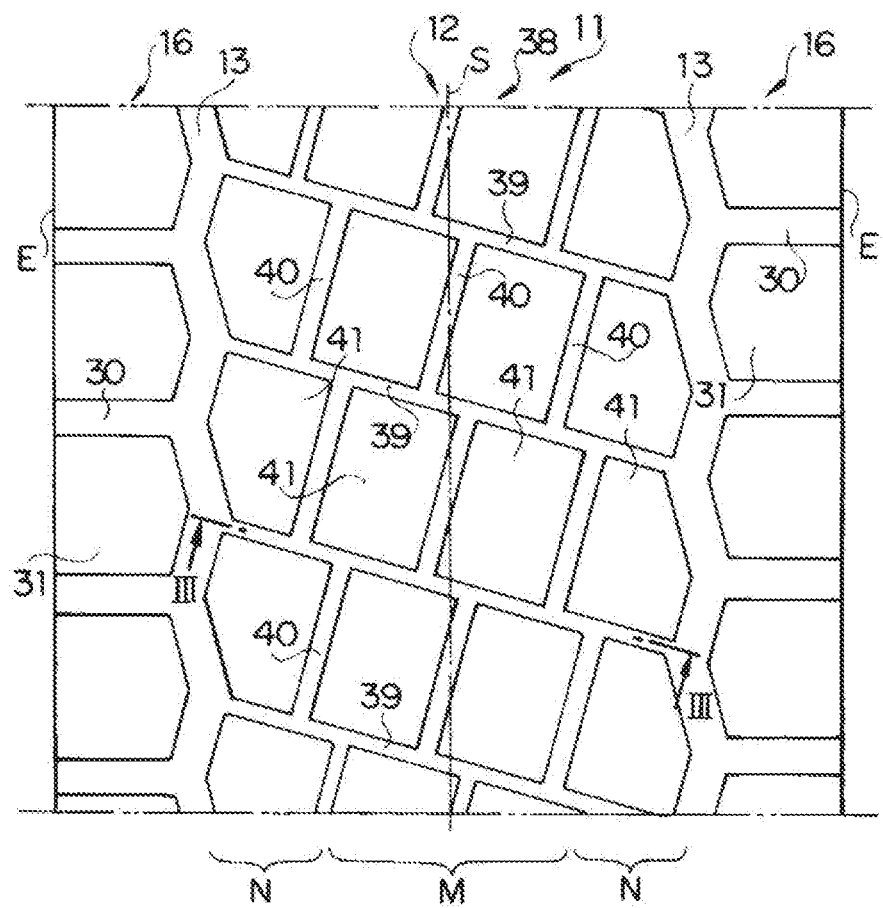
FIG. 6 is a plan view of a tread portion illustrating Embodiment 4 of the invention.
Figure 7:
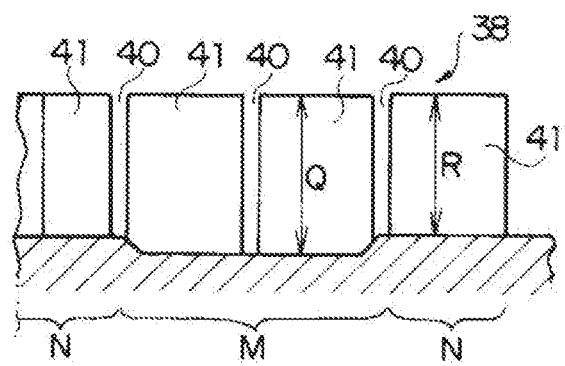
FIG. 7 is a sectional view taken along line in FIG. 6.
Figure 8:
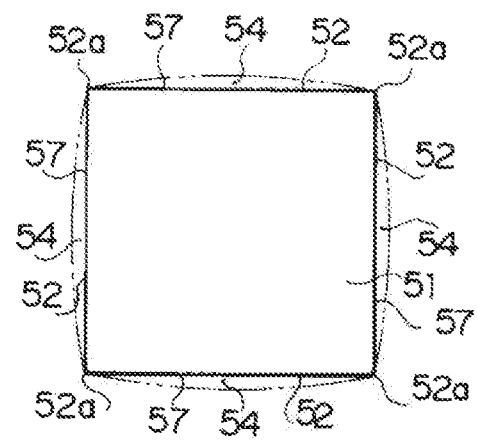
FIG. 8 is an explanatory view for explaining a deformed state of a block in a conventional tread portion.
Figure 9:
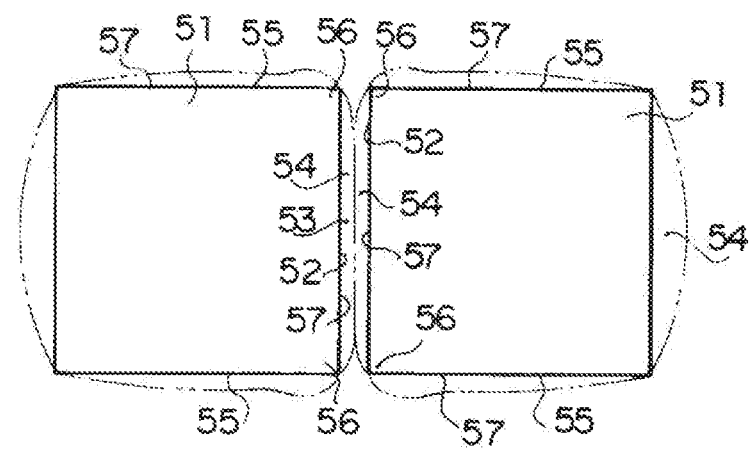
FIG. 9 is an explanatory view for explaining a deformed state of blocks in a conventional tread portion.

FIGS. 6 and 7 are views illustrating Embodiment 4 of the present invention. In this embodiment, the proximal land portion 14 and the intermediate land portions 15 are integrated to form a wide proximal land portion 38, and microgrooves 39 similar to the microgrooves 19 and crossing microgrooves 40 similar to the crossing microgrooves 21 are formed in the proximal land portion 38, so that a plurality of blocks 41 are defined in the proximal land portion 38 by the microgrooves 39 and the crossing microgrooves 40. Furthermore, three crossing microgrooves 40 parallel to each other are formed and arranged at equal intervals in the extending direction of each microgroove 39 in this embodiment. Moreover, a groove depth Q of the microgrooves 39 and the crossing microgrooves 40 located in a proximal portion M adjacent to the tire equator S among the microgrooves 39 and the crossing microgrooves 40 formed in the proximal land portion 38, is larger than a groove depth R of the microgrooves 39 and the crossing microgrooves 40 located in a distal portion N spaced from the tire equator S. By setting the groove depth of a portion of the microgrooves 39 and the crossing microgrooves 40 located closer to the tire equator S large as described above so as to facilitate crushing of the blocks 41 at the time of grounding, sidewalls of blocks 41 come into contact with each other over a large area at the time of grounding. Consequently, the rigidity of these blocks 41 is improved, and the rolling resistance decreases. Although the groove depth of the microgrooves 39 and the crossing microgrooves 40 are increased stepwise as approaching the tire equator S in this embodiment, it is to be noted that the groove depth may be increased continuously in the present disclosure.

Example 1

Next, a test example will be described. In this test, Conventional Tire having the above-described value L (distance)/P (arrangement pitch) of 0/12 (crossing microgrooves are on a straight line), Comparative Tire 1 having a value L/P of 2/12, Comparative Tire 2 having a value L/P of 3/12, Example Tire 1 having a value L/P of 4/12, Example Tire 2 having a value L/P of 5/12, and Example Tire 3 having a value L/P of 6/12 were prepared. Here, the tread pattern of each tire was substantially the same as that depicted in FIG. 1, except that a disappearing shape of each block was adjusted to set the groove width of the inner main grooves and the amplitude of the zigzag to be the same value. Here, the size of each of the above-described tires was 275/80R22.5, and the groove depths of the main grooves, the microgrooves, and the crossing microgrooves were the same.

Next, each of such tires was mounted on a rim having a size of 7.50×22.5, and the inside of each tire was filled to have an internal pressure (gauge pressure) of 900 kPa. Each tire was then mounted on a heavy-weight vehicle. Thereafter, such a vehicle was run on a wet road surface, and the wet performance (steering stability) at the time of running was evaluated and indexed based on feeling of the driver. Here, the larger the numerical value is, the better the wet performance is. Next, index evaluation of the rolling resistance of each tire was carried out by running each of the above-described tires on a drum at 70 km/h, and then inertially rotating the drum and measuring the degree of deceleration during inertial rotation. Here, the smaller the numerical value is, the less the rolling resistance is, which indicates that the better the tire is. The following Table 1 shows the results of such a test. As is clear from this test result, the wet performance can be effectively improved without lowering the rolling resistance in a case in which the value of L/P is within the range of from ⅓ to ½.

TABLE 1

| TYPE OF TIRE | CONVEN-TIONAL TIRE | COMPARATIVE TIRE | | EXAMPLE TIRE | | |
|---|---|---|---|---|---|---|
| | | 1 | 2 | 1 | 2 | 3 |
| L/P | 0/12 | 2/12 | 3/12 | 4/12 | 5/12 | 6/12 |
| WET PERFORMANCE | 5 | 5 | 5 | 8 | 9 | 9 |
| ROLLING RESISTANCE | 8 | 8 | 8 | 8 | 8 | 8 |

INDUSTRIAL APPLICABILITY

The present disclosure can be applied to the industrial field of a pneumatic tire having at least one main groove formed in each tread portion on either side of the tire equator.

The disclosure of Japanese Patent Application No. 2016-112204 filed on Jun. 3, 2016, is incorporated herein by reference in its entirety.

All documents, patent applications, and technical standards described in this specification are incorporated herein by reference to the same extent as a case in which individual documents, patent applications, and technical standards are specifically and individually referred to be incorporated by reference.

The invention claimed is:

1. A pneumatic tire comprising:
   at least one main groove formed in each tread portion on either side of a tire equator S to form a plurality of land portions,
   a microgroove that extends in a width direction and closes at a time of grounding, and
   a crossing microgroove that crosses the microgroove and closes at the time of grounding,
   wherein the microgroove and the crossing microgroove are formed in at least one of the land portions, such that block groups, each consisting of a plurality of blocks aligned along the microgroove, are arranged in the at least one of the land portions repeatedly in a circumferential direction,
   wherein widthwise sidewalls of blocks in a block group arranged adjacent to each other in a circumferential direction are displaced from each other along the microgroove by a distance L corresponding to from ⅓ to ½ of an arrangement pitch P of the blocks,
   wherein both the microgroove and the crossing microgroove are on the tire equator S,
   wherein both the microgroove and the crossing microgroove are linear, with the microgroove being linear from one main groove to another main groove,
   wherein the microgroove and the crossing microgroove are formed in a proximal land portion in closest proximity to the tire equator S, and
   wherein a microgroove and a crossing microgroove are also formed in a land portion other than the proximal land portion, and a groove depth H of the microgroove and the crossing microgroove formed in the proximal land portion is larger than a groove depth J of the microgroove and the crossing microgroove formed in the land portion other than the proximal land portion.

2. The pneumatic tire according to claim 1, wherein the groove depth H of the microgroove and the crossing microgroove formed in the proximal land portion is larger than a groove depth F of a main groove that comes into contact with the proximal land portion at a widthwise outer side.

3. The pneumatic tire according to claim 1, wherein a groove depth H of the microgroove and the crossing microgroove formed in the proximal land portion is larger than a groove depth F of a main groove that comes into contact with the proximal land portion at a widthwise outer side; and
   the microgroove is inclined with respect to a tire meridian G.

4. The pneumatic tire according to claim 1, wherein the plurality of blocks includes only two blocks.

5. A pneumatic tire comprising:
   at least one main groove formed in each tread portion on either side of a tire equator S to form a plurality of land portions,
   a microgroove that extends in a width direction and closes at a time of grounding, and
   a crossing microgroove that crosses the microgroove and closes at the time of grounding,
   wherein the microgroove and the crossing microgroove are formed in at least one of the land portions, such that block groups, each consisting of a plurality of blocks aligned along the microgroove, are arranged in the at least one of the land portions repeatedly in a circumferential direction,
   wherein widthwise sidewalls of blocks in a block group arranged adjacent to each other in a circumferential direction are displaced from each other along the microgroove by a distance L corresponding to from ⅓ to ½ of an arrangement pitch P of the blocks,
   wherein both the microgroove and the crossing microgroove are on the tire equator S,
   wherein both the microgroove and the crossing microgroove are linear, with the microgroove being linear from one main groove to another main groove,
   wherein the microgroove and the crossing microgroove are formed in a proximal land portion in closest proximity to the tire equator S;
   wherein a microgroove and a crossing microgroove are also formed in a land portion other than the proximal land portion, and a groove depth H of the microgroove and the crossing microgroove formed in the proximal land portion is larger than a groove depth J of the microgroove and the crossing microgroove formed in the land portion other than the proximal land portion; and
   wherein the microgroove is inclined with respect to a tire meridian G.

* * * * *